United States Patent [19]

Gross et al.

[11] Patent Number: 5,196,052
[45] Date of Patent: Mar. 23, 1993

[54] BACTERIAL-ASSISTED HEAP LEACHING OF ORES

[75] Inventors: Anthony E. Gross, St. Charles; Jay S. Gomer, Geneva, both of Ill.

[73] Assignee: Nalco Chemical Company, Naperville, Ill.

[21] Appl. No.: 901,508

[22] Filed: Jun. 19, 1992

[51] Int. Cl.$^5$ .............................................. C01G 5/00
[52] U.S. Cl. ...................................................... 75/712
[58] Field of Search ..................... 75/712, 772; 423/27, 423/29

[56] References Cited

U.S. PATENT DOCUMENTS

| | | | |
|---|---|---|---|
| 4,497,778 | 2/1985 | Pooley | 423/27 |
| 4,571,387 | 2/1987 | Bruynesteyn | 423/27 |
| 4,729,788 | 3/1988 | Hutchins | 423/27 |
| 4,875,935 | 10/1989 | Gross | 75/772 |
| 4,961,777 | 10/1990 | Perez et al. | 75/313 |
| 5,077,021 | 12/1991 | Polizzotti | 423/27 |
| 5,077,022 | 12/1991 | Polizzotti | 423/29 |
| 5,100,631 | 3/1992 | Gross | 423/29 |

OTHER PUBLICATIONS

"The Agglomeration of Fine Material for Bacterial Heap Leaching", A. J. Southwood, Mintek Report No. M191, Mar. 25, 1985.
"Parameters Affecting the Bacterial Heap Leaching of Low-Grade Nickeliferous Material", A. J. Southwood, Congres International de Mineralurgie, (Compte Rendu) 15th vol. 2, 1985, pp. 400-412.
"Biohydrometallurgy of Gold", A. E. Torma, Canmet Spec. Publ., 1987, vol. SP86-9, 1992, pp. 3-24.
"Microbiological Aspects of Leaching Copper From Ores", G. I. Karavaiko, T. V. Kovalenko and R. S. Golovacheva, Proc. Int. Conf. Use Microorg. Hydrometall. 1980, pp. 95-107.
"Current Standing of Bacterial Heap, Dump and In-Situ Leaching Technology of Copper", A. E. Torma, Metall. 38. Nov. 1984, pp. 1044-1047.
Literature Search Report, "Agglomeration Aids For Biological Heap Leaching", Mar. 1992, pp. 1-5.

Primary Examiner—Peter D. Rosenberg
Attorney, Agent, or Firm—Joan I. Norek; Robert A. Miller; Joseph B. Barrett

[57] ABSTRACT

A bacterial-assisted heap leach process is employed for the solubilization of a metal from a refractory ore containing fines and/or clay wherein at least a portion of the metal is solubilized by the bacterial oxidation of sulfides and the concomitant or sequential dissolution of the metal into a leaching solution. For some metals, the leaching solution has a pH of greater than about 9. The improvement in the process includes the application of an aqueous solution of acrylamide polymer to the ore in an amount effective to agglomerate the fines and/or clay prior to heap formation. The acrylamide polymer has a molecular weight of at least 500,000 and is comprised of from about 0 to about 100 mole percent of (meth)acrylamide mer units and from about 0 to 100 mole percent of N-sulfoalkyl(meth)acrylamide mer units. The acrylamide polymer is preferably applied to the ore as an aqueous solution formed at least in part by recycled bio solution.

24 Claims, No Drawings

BACTERIAL-ASSISTED HEAP LEACHING OF ORES

TECHNICAL FIELD OF THE INVENTION

The present invention is in the technical field of the biohydrometallurgy process known as bacterial heap leaching.

BACKGROUND OF THE INVENTION

Some metals are recovered from their mined ores by the use of aqueous solutions to leach or dissolve the desired metal from such ore. The aqueous solution used for a given metal contains some chemical agent that converts the metal to a soluble form. For instance, gold and silver may be recovered from a gold-containing and silver-containing ores by leaching such ores with an aqueous solution of cyanide (routinely but not necessarily sodium cyanide) to form gold cyanide and silver cyanide, or complexes thereof. Such species are soluble in water or at least in the aqueous leaching solution at the concentrations sufficient for pregnant liquors. Gold and silver in mined ores are typically in their elemental states. As another example, base metals such as copper (typically as copper oxide) and nickel, which generally are not found in their elemental states in ores, are leached from ore with dilute sulfuric acid solution, which dissolves the metal as the sulfate ($SO_4^-$) form.

After leaching, the desired metal is recovered from the leaching solution, which is referred to as the "pregnant liquor" when it contains the solubilized metal. For instance, an aqueous solution that contains gold cyanide may be directly treated with zinc dust whereby zinc is oxidized to zinc cyanide, and the gold of the gold cyanide is reduced to elemental gold. Other methods are used for other metals.

At the time the pregnant liquor is processed to release the metal, such liquor has of course been separated from the undesirable, and generally undissolved, ore constituents, known as "mud", "mud refuse", or "gangue", or as "tailings" when spent in the sense of being substantially depleted of the desired metal value.

One method of leaching generally is called "heap leaching". In a heap leaching method, the ore is placed in an immense stack or heap, which heap is then leached by percolating the leaching solutions from the top of the heap down, and collecting the effluent (the pregnant solution from which the desired metal is recovered) from the bottom. Heap leaching is a commercially viable method of extracting the desired metal from low grade ores.

There exist large deposits of refractory ores that are not amenable to conventional leaching. The metal, such as gold, may be physically entrapped in a matrix of sulfide metals, such as iron pyrite and arsenopyrite. The matrix is not penetrated by cyanide solution and thus a cyanide solution alone cannot extract and dissolve the gold from such ore. The metal may also itself be chemically bound within a sulfide matrix, such as when base metals are in a sulfide form, and as such cannot be leached with sulfuric acid.

One method being explored commercially is the bacterial or biological oxidation or digestion of the sulfide material to sulfates. Such "bio oxidation" will break down a sulfide matrix, freeing the elemental gold and thus allowing contact of the gold with the dissolving solution. Such bio oxidation will also oxidize base metals sulfide(s), which then can be solubilized in sulfuric acid.

When bacterial digestion of ore is used in a heap leaching method, the ore, after heaping, is treated with the bio solution, which is applied to the top of the heap by sprinkling and allowed to percolate or seep down through the heap and therein attack the sulfide matrix. The treatment with the bio solution is continued until the practical limits of sulfide matrix oxidation are met. Then the leaching with the metal solubilizing solution may begin. This mining process is referred to as bacterial heap leaching or bacteria-assisted heap leaching.

The conditions of the bio oxidation step may be, however, extremely different from those of the metal leaching. The bio oxidation is conducted under extremely acidic conditions, while the cyanide solution leaching of gold or silver is, for safety reasons, conducted using extremely alkaline conditions. The bio oxidation releases ferric ions, and thus the bio solution as used commercially has a very high iron content, in contrast to precious metal leaching solutions, which have extremely low iron contents because iron hydrous oxide is removed by precipitiation in the high pH environments thereof. Some base metal leaching solutions, such as copper, do have high ferric ion concentrations, for instance of the order of 5 grams of ferric ion per liter of solution, but the aqueous solution used to apply the agglomeration aid would not normally have a high iron concentration.

The ore heap must remain permeable to the treating solutions, and to the air, during both the bacterial oxidation and the leaching of the metal. Channelling, blinding, ponding, slumping and other consequences will occur if heap permeability is lost, or diminished, or lost in portions of the heap, and such consequences will at minimum decrease the efficiency of the bacterial heap leaching process.

U.S. Pat. No. 4,875,935, Gross et al., October 1989, discloses a method for extracting copper by heap leaching which includes agglomerating the fines prior to heap formation using as the agglomerating agent an anionic polyacrylamide. Such polymer contains at least 5 mole percent of carboxylate or sulfonate groups, and has a molecular weight of at least 100,000. U.S. Pat. No. 5,100,631, Gross, March 1992, discloses a method for extracting gold and silver by heap leaching which includes agglomerating the fines prior to heap formation using as the agglomerating agent a water-soluble vinyl polymer having a molecular weight of at least 500,000, used alone or in conjunction with inorganic co-agglomerating agents such as cement. Such polymers include acrylamide copolymers having from 5 to 95 wt. percent of acrylamide and the comonomers can be sulfonate-containing and carboxylate-containing materials. U.S. Pat. No. 5,077,021 and U.S. Pat. No. 5,077,022, both Polizzotti, Dec. 31, 1991, disclose the use of a high molecular weight anionic polyacrylamide, a copolymer of acrylic acid and acrylamide, alone, or together with cement, to agglomerate ore prior to heap leaching with cyanide solution. U.S. Pat. No. 4,961,777, Perez et al., Oct. 9, 1990, discloses for refractory ores the incorporation of hypochlorites into the ore agglomerates as they are formed, whereby the hypochlorites act on the refractory components, such as sulfidic matter, as an oxidative pretreatment, in a heap leaching method. The agglomeration aid employed is Portland and/or gypsum cement.

It is an object of the present invention to provide for a bacterial-assisted heap leach process an agglomerating aid treatment that forms a strong agglomerate of the heaped ore, reduces channeling of the percolated solution(s), reduces blinding and ponding (wherein the heap becomes so impermeable to the solution(s) to be percolated that such solution(s) collects on the top of the heap), and provides enduring agglomeration despite the extreme conditions and requirements encountered in a bacterial heap leaching process. These and other objects of the present invention are described in more detail below.

DISCLOSURE OF THE INVENTION

The present invention provides a bacterial-assisted heap leach process for the solubilization of a metal from a refractory ore containing the metal and containing fines and/or clay. The process includes the application of an aqueous solution of acrylamide polymer to said ore in an amount effective to agglomerate said fines and/or clay. The acrylamide polymer has a molecular weight of at least 500,000 and is comprised of from about 0 to about 100 mole percent of (meth)acrylamide mer units and from about 0 to 100 mole percent of N-sulfoalkyl (meth)acrylamide mer units.

PREFERRED EMBODIMENTS OF THE INVENTION

Fines greatly reduce the permeability of the heap if left in the ore, but their metal values commonly justify agglomeration to larger particles instead of elimination prior to heap formation. Agglomeration, as that term is used for the mining process(es) being discussed herein, is an aggregation process wherein small particles, the "fines", combine into larger masses or clumps, or combine together with larger particles. In either instance, to be considered an effective agglomeration process, the fines must be bound as agglomerates (the larger particles formed of fines, or combination of larger particles and fines), and the agglomerates thus formed must not break down in any significant degree during the conveying, the bio oxidation or the leaching of the ore to dissolve the metal values.

When solids are agitated, they tend to segregate by size. Such segregation in an ore heap leads to "channelling", wherein solutions that are percolated or seeped down through the heap will preferentially flow through areas of coarse particles, and avoid the areas comprised of fines. An area of unagglomerated fines of course would be more highly compacted, and thus less, permeable, than the coarse particle areas. Channelling impairs the efficiency of both the bio oxidation and the leaching steps because the preferential solution flows leave the unpreferred heap sections dry, or at least deficiently treated. The segregation of fines before, during or after heap formation is highly undesirable.

A related condition is the partial or complete blinding or plugging of the heap. In heap leaching processes generally, the ore is never slurried in an aqueous medium. There is never a continuous aqueous phase in which the ore is immersed. To do otherwise would almost invariably lead to blinding of the ore mass or heap. The ore must remain permeable to both water solutions and to air. A fundamental measure taken to prevent blinding thus is the avoidance of any over wetting of the ore.

Similarly the migration of fines and/or clay particles, which can lead to blinding, should be prevented. When fines are present in significant amounts, for instance 20 or 30 weight percent, based on the total weight of the ore as mined, which is very common, migration of fines is a serious problem. Ores vary as to clay content, which generally can range from about 5 or 10 percent to about 50 percent of the ore by weight. Many clays swell, and some clays, for instance bentonite, swell extremely, when contacted with water. The avoidance of any immersion of the ore in water, discussed above, of course diminishes clay swelling to at least some extent. Nonetheless the swelling clays in the ore may swell to some degree under the leaching conditions, and such swollen clay and other clays must also be prevented from migration, or plugging will occur. Thus an agglomeration aid preferably should not only bind fines, but should also "stabilize" the clay in the sense of preventing any significant degree of clay migration, by its binding action.

The permeability of the heap to percolating solutions and air can also be diminished by a phenomenon known as "slumping". Slumping is a condition wherein the heap generally becomes more compact after formation, losing overall volume by virtue of a loss of void volume within. Loss of void volume within the heap of course diminishes its permeability. Slumping is generally manifested after sprinkling has commenced. On a laboratory scale, slumping is generally seen, if at all, within the first 24 hours of sprinkling. On a commercial scale, slumping occurs over a longer time period. A heap's resistance to slumping is a measure of the strength of the agglomerates therein.

The present invention provides for a bacterial-assisted heap leaching process a method wherein the ore is agglomerated with an effective amount of a certain acrylamide polymer, as an agglomeration aid, prior to heaping, which maintains a sufficient degree of heap permeability that endures through both the bio oxidation and the metal leaching steps.

Ore as mined has a particle size of about −4 inches, and it is normally then crushed to a smaller particle size to increase the surface area of the ore and release the metal. Ore is commonly crushed to a particle size of from about −1 inch to about −2 inches, but may be about −⅜ inch on the smaller particle size side. In contrast, the portion of the ore that is considered fines is comprised of particles that would pass through a 100 mesh screen. By "−__ inch" is meant in the industry, and herein, that most all of the particles in the material would pass through a screen having such diameter as its smallest internal diameter. The ore may actually be screened, but more commonly the overall mass of ore is determined by other methods to have such general particle size that most would pass through the screen.

In the present invention the crushed ore is then sprayed with an aqueous solution containing the agglomeration aid, and tumbled. The amount of water applied to the ore during this spraying is generally from about 2, or 3, percent to about 10 or 12 percent, based on the weight of the ore as mined. Ore as mined contains about 3 to about 10 percent water, the balance being solids that would remain upon oven drying. The agglomeration aid is dissolved in that water at a concentration to provide an amount of agglomeration aid in the ore that is effective to provide the permeability desired. Preferably the dosage of agglomeration aid, as polymer actives, is from about 0.01 to about 5 pounds of agglomeration aid per ton of ore as mined, or from about 0.01 to about 5.5 pounds of the agglomeration aid per dry ton of ore (oven dry ton of ore).

During or shortly after the spraying of the agglomeration aid solution, mechanical agitation of the ore is required to distribute the agglomeration aid through the ore. Such mechanical agitation may be provided by tumbling the ore. The tumbling of the ore together with the aqueous solution of agglomeration may done in a rotary drum agglomerator or pug mill, or the ore can be treated and tumbled by the mechanical action of conveyor belt transfer points or the cascading of the ore as the heap is formed. The tumbling action is provided for a very short time period, and generally that time period is less than a minute.

The water employed as the solution vehicle for the agglomeration agent preferably is the bio oxidation solution itself. The use of the bio oxidation solution at this step is highly preferred commercially because it provides an initial inoculation of the bacterial solution. There is no practical reason commercially to employ plain water that then requires displacement with the bio oxidation solution. In commercial practice, such bio oxidation solution would routinely be a recycled bio oxidation solution, and hence not only be very acidic but also contain a high concentration of iron, as discussed in more detail below. By recycled is meant herein not merely a recycling during a given bacteria-assisted heap leaching but also from another such process to the one commencing.

If the aqueous vehicle for the agglomeration aid is not the bio oxidation solution itself, the aqueous vehicle preferably is acidic, and thus more compatible with the bio oxidation solution subsequently applied than plain water. In nonpreferred embodiments of the invention, the use of the bio oxidation solution or an acidic aqueous solution as the agglomeration aid vehicle is not essential, and the use of unadulterated or plain acidic water as the vehicle for the agglomeration aid during its application to the ore is not precluded. Such a process is not believed to have any utility for a commercial bacterial-assisted heap leach process.

As noted above, the ore should never be immersed in water. The amount of water used for the application of the agglomeration aid should thus not make the ore wet to the touch. If the ore is overly wetted by the spraying, it would gum up the transfer points on the conveyance system.

After application of the agglomeration agent in the spraying/tumbling step, the ore is fed into a heap. Such a heap is usually at least 10 feet high, and can be 30 or more feet high, 100 feet or more in width, and up to about 2,600 feet in length, on a commercial scale. Such heap is routinely not enclosed, but instead open to the air. It is provided with an overhead sprinkler system or other means to introduce the desired solutions at the top of the heap, and a pad at the bottom. The treatment fluids are sprinkled (or sprayed, flooded, emitted or otherwise applied) over the heap, and then they percolate or seep through the heap. When they reach the bottom pad, they drain or run off to the side to a pond or reservoir. The bottom pad must of course be impervious or inert to the treatment fluid(s) being used, and are commonly formed of polyethylene, and at times of compacted clay.

The typical application rate of a percolation solution is about 0.005 gallons of fluid per minute per square foot of the heap's top surface. The percolation generally is unassisted gravitational flow, and thus the flow rate is determined primarily by the application rate and the permeability of the heap. In general the flow rate of percolation through the heap can vary from about 0.001 to about 0.01 gallons of fluid per minute per square foot (of a horizontal plane), but the lower rates are often considered undesirably slow and indicators of permeability problems, and the higher rates are seldom achieved and seldom desirable for effective bio oxidation and leaching.

In the present bacterial-assisted heap leach process, the bio oxidation solution generally is the first fluid percolated through the heap. The bio oxidation solution recovered as run off from the bottom pad preferably is recycled back to the sprinkler. The percolation with bio oxidation solution continues until the sulfides are broken down (oxidized) to the desired degree. The bacteria used in the bio oxidation solution are Thiobacillus microorganisms, discussed in more detail below. These bacteria operate at low pH conditions, and themselves produce sulfuric acid. The ore in the heap is in contact with extremely acidic water of high ferric iron concentration during this percolation period. The pH of the percolating solution is generally less than 3, and often within the range of from a pH of about 1.2 or 1.3, to a pH of about 2.5 or 2.6. This percolation period can be extensive, lasting even for months until the desired degree of breakdown of the sulfides is achieved.

Upon termination of the bio oxidation percolation period, the percolation with the desired leaching, or solubilization solution may be commenced. When the metal being processed is gold or silver, the heap may be rinsed with plain water to remove the acid solution from the ore. The leaching solution for gold and silver contains typically from about 500 to about 1,000 ppm of sodium cyanide. The pH of such leaching solution is maintained at from about a pH of 9.5, or 10, to about a pH of 11.5 or 12. For safety considerations, it is not uncommon to avoid a pH of less than about 10.5, to assure that no fumes of hydrogen cyanide are formed and escape into the air, and a pH of greater than about 11 is generally not necessary for that purpose.

When the percolating fluid is the leaching solution, the run off the bottom pad is referred to as "pregnant" liquor because it contains the desired metal, in solubilized form. The pregnant liquor is collected at the bottom of the heap, and subjected to further processing to remove the subject metal. Upon removal of the metal, the "barren" liquor is rejuvenated, or reconstituted, for instance the replenishing the cyanide, caustic and water to the extent required, and such reconstituted liquor is then recycled back to the sprinkler.

The present invention in broad embodiment does not preclude at least some degree of concomitant bio oxidation and leaching wherein the environments thereof are not wholly incompatible. For instance, the acidic bio solution is normally a sulfuric acid solution, and thus such bio solution also is the leaching solution for copper, and upon the bio oxidation of sulfidic material the copper will be solubilized into the bio solution.

In the bacteria-assisted heap leaching of precious or base metal-containing ore, oxygen is required for the action of the bio solution and the leaching solution. (The conversion of elemental gold or silver into soluble cyanide forms is an oxidation reaction. The conversion of base metal sulfides into the base metal sulfate form is an oxidation reaction.) Both carbon dioxide and oxygen are normally required for the action of the bio solution. The heap should remain permeable to both the percolating fluids and to air throughout the processing. The percolation of leaching solution alone can continue for time periods ranging from about a month to about several months or even a year or more. The extent of leaching is determined by the time required to reach the targeted low value of residual metal in the ore.

The combination of percolation of first the bio oxidation solution and then the leaching solution can endure for a year's time or more. During such extensive time periods the heap is exposed to the surrounding environmental conditions. Gravity is always acting on the heap. During a process for recovering gold or silver or the like, the heap is subjected first to extremely acidic conditions and then to extremely alkaline conditions. The agglomerates must endure throughout.

The other extreme environmental condition is the level of ferric ions that are present during both the application of the agglomerating aid and the percolation period of the bio oxidation solution. The sulfides are at least in part iron sulfide, and the oxidation of such sulfides releases a high concentration of ferric ions into the aqueous percolating bio oxidation solution. The bio oxidation solution is routinely recycled and thus has an extremely high iron content. Such iron is typically in the form of the ferric ion, present in amounts of from about 1 to about 20, and very commonly in amounts of from 5 to 10 grams per liter. The ferric ions are cationic. The agglomeration aid may have at least some anionic nature. Nonetheless the agglomeration aid of preferred embodiments does not, to any extent, interact with, or flocculate, ferric ion when ferric ion is present during application of the agglomeration aid. Such interaction would result in the precipitation of the iron/agglomeration agent complex, and the agglomeration agent would be lost as an effective particle binder. Moreover, the agglomeration step is, and generally can, be done only once, and the agglomeration binding provided by the present invention in broad embodiment endures through all subsequent process steps despite the extreme environmental conditions to which it, and the heap, are subjected.

Bio oxidation of the sulfide matrix requires that the bacteria accomplishing the digestion not only remain viable but also grow under the heap conditions. Any chemical agent that is toxic to the biomass, or inhibits its growth, cannot be added to the heap during the digestion stage. The agglomeration aid of the present invention is believed to be nontoxic and noninhibitory towards the microorganisms of the bio oxidation solution, and hence not harmful thereto should any amount of the agglomeration aid be dissolved in the bio oxidation solution.

The agglomeration aid of the present invention not only provides all of these highly desirable characteristics, but also provides a strong agglomerate that greatly reduces heap slump.

The agglomeration aid of the present invention also provides advantageously small, uniform-sized agglomerates, and leaves few fine particles outside of the agglomerates, even though applied in an aqueous recycled bio solution.

The process of the present invention generally:
1. Provides the desired agglomeration activity under highly acid conditions, which typically are less than a pH of 3, and at times are within the pH range of from about 1.0, or 1.3, to 2.0, or 2.5, in the presence of a high ferric ion concentration of from about 1 to about 20;
2. Is non-toxic and non-inhibitory to bio growth;
3. Is a non-flocculant to the iron present in the agglomeration aid application solution;
4. Provides retained agglomeration stability, once formed, despite extremes in pH, bio digestion and/or leaching and despite high concentrations of ferric ion in the percolated recycled bio solutions;
5. Stabilizes both fines and clays in the ore against migration; and
6. Allows both the percolating solutions and the carbon dioxide and oxygen of the air to permeate throughout the heap.

In more detail, bacterial-mediated leach processes are recognized to be relatively inexpensive, low in energy consumption, and environmentally safe if operated correctly. The solution used for the bacterial-assistance step generally is dilute sulfuric acid usually carrying bacteria of the Thiobacillus genus, which have been well described in the literature, and are well known and readily available to those in the biohydrometallurgy field. The microorganism *Thiobacillus ferrooxidans*, the principal organism responsible for the oxidation of metal sulfides, was identified about 45 years ago. These bacteria are classified as acidophilic and mesophilic microbial species.

The environmental conditions of choice for the growth and leaching by Thiobacillus microorganisms are generally considered to be: a low pH, for instance a pH of from about 2.3 to about 2.5, although lower pH values down to about 1 may be employed to inhibit ferric precipitation from the lixiviant; oxygen and carbon dioxide; and a temperature of from about 25° to about 35° C. The pH of the percolating solution containing these microorganisms preferably is less than 3, and more preferably within the range of from a pH of about 1.2 or 1.3, to a pH of about 2.5 or 2.6.

Inorganic substrates, particularly iron and sulfur containing substrates, are oxidized by these microorganisms, producing ferric ions and sulfuric acid as oxidation products.

More detailed descriptions of the use of Thiobacillus microorganisms in the biohydrometallurgy field are found in:

"Current Standing Of Bacterial Heap, Dump And In-Situ Leaching Technology Of Copper", A. E. Torma and N. M. Socorro, Metall., 38(11), 1044-7, 1984;

"Parameters Affecting The Bacterial Heap Leaching Of Low-Grade Nickeliferous Material", A. J. Southwood, P. C. Miller, and I. J. Corrans, Congres International De Mineralurgie, (Compte Rendu), 15th, Vol. 2, 400-12, 1985, the disclosures of all of which are hereby incorporated hereinto by reference.

The acrylamide polymer employed in the process of the present invention has a weight average molecular weight of at least about 500,000. The polymer preferably is comprised of from about 0 to 100 mole percent of (meth)acrylamide mer units, and from about 0 to about 100 mole percent of N-sulfoalkyl (meth)acrylamide mer units, which provide a pendant sulfonate radical. Such acrylamide polymer should be water soluble, or at least water dispersible, at its use concentration in the present process. By "use" concentration is meant herein its concentration in the aqueous solution in which it is applied to the ore. In preferred embodiment, the use concentration of the acrylamide polymer is from about 0.004 to about 12.5 weight percent of polymer actives based on the weight of the aqueous solution being applied to the ore. The acrylamide polymer employed in the present invention generally will be water soluble at a concentration within this range. Such a polymer is substantially linear and substantially free of pendant hydrophobic radicals or hydrophobic polymer backbone segments, but the present invention does not exclude acrylamide polymers having some branching or cross-linking, or some hydrophobic moieties, provided the polymer retains the desired degree of water solubility. An amphoteric acrylamide polymer similarly is not excluded for use in the present process.

Anionic moieties of the carboxyl radical type, however, generally cannot be tolerated in any significant degree in the acrylamide polymer for the present process unless the agglomeration aid is applied to the ore in aqueous solution other than recycled bio solution. It may be possible that in some acrylamide polymers up to about 10 mole percent of carboxyl-radical containing mer unit might be tolerated for use of such polymer in the present process even if a high concentrations of ferric ion are present in the polymer solution when applied, but it is believed that even 1 mole percent of such mer units could severely diminish the agglomeration performance of the polymer. In preferred embodiment the acrylamide polymer used in the process of the present invention is substantially free of pendant carboxyl radical.

In a preferred embodiment, the acrylamide polymer is substantially a homopolymer of (meth)acrylamide. In another preferred embodiment, the acrylamide is substantially a homopolymer of N-sulfoalkyl (meth)acrylamide.

In another preferred embodiment the acrylamide polymer is comprised of from about 0.1 to about 40 mole percent of aforesaid N-sulfoalkyl (meth)acrylamide mer units, and in more preferred embodiment from about 1 to about 25 mole percent thereof, while the remainder of the mer units are substantially (meth)acrylamide. In another preferred embodiment, the acrylamide polymer is comprised of from about 5 to about 15 mole percent of aforesaid N-sulfoalkyl (meth)acrylamide mer units, and the remainder of the mer units are substantially (meth)acrylamide.

In another embodiment, the acrylamide polymer is comprised of (meth)acrylamide mer units and cationic mer units, preferably of the quaternary ammonium salt type, such as the quanternized salts of mer units of N-alkylsubstituted aminoalkyl esters of acrylic acid and others, including, for example:
1. the quaternized salts of reaction products of a polyamine and an acrylate type compound prepared, for example, from methyl acrylate and ethylenediamine;
2. (methacryloyloxyethyl)trimethyl ammonium chloride;
3. diallylmethyl(beta-propionamido)ammonium chloride, (beta-methacryloyloxyethyl)trimethylammonium methyl sulfate, and the like;
4. quaternized vinyllactam;
5. the quaternized salt of vinylbenzyltrialkylamines such as, for example, vinylbenzyltrimethylammonium chloride;
6. quaternized salt of vinyl-heterocyclic monomers having a ring nitrogen, such as (1,2-dimethyl-5-vinylpyridinium methyl sulfate), (2-vinyl-2-imidazolinium chloride) and the like;
7. dialkyldiallylammonium salt including diallyldimethyl ammonium chloride ("DADMAC");
8. methacrylamidopropyltrimethylammonium chloride ("MAPTAC");

In preferred embodiment, the acrylamide polymer contains up to 50 mole percent of such cationic mer units, and in more preferred embodiment up to about 30, or 40, mole percent thereof. A preferred cationic mer unit is DADMAC.

In another preferred embodiment, the acrylamide polymer is comprised of at least 40, or 50, mole percent of (meth)acrylamide mer units or N-sulfoalkyl (meth)acrylamide mer units or combinations thereof.

In preferred embodiment, the acrylamide polymer has a weight average molecular weight of at least 1,000,000, and in more preferred embodiment at least about 4,000,000, or 5,000,000. The polymer has no known molecular weight ceiling for the purposes of the present invention. The water solubility characteristic required of the acrylamide polymer need not necessarily provide such a ceiling because even acrylamide homopolymers, substantially free of any electrolytic groups, are soluble in water at concentrations within the present preferred use concentration range, at least up to the high molecular weights that can be provided by now conventional synthesis techniques.

Acrylamide polymer comprised of (meth)acrylamide mer units and N-sulfoalkyl (meth)acrylamide mer units may be directly synthesized from the corresponding monomers by known techniques, for instance using as the sulfonate-containing monomer the 2-(meth)acrylamido-2-methylpropane sulfonic acid, or the methacrylamide version thereof. N-sulfoalkyl (meth)acrylamide mer units can also be incorporated into an existing polymer by post-polymerization derivatization, for instance by one of the methods described in U.S. Pat. No. 4,762,894 (Fong et al.) issued Aug. 9, 1988, U.S. Pat. No. 4,680,339 (Fong) issued Jul. 14, 1987, U.S. Pat. No. 4,795,789 (Fong) issued Jan. 3, 1989, and U.S. Pat. No. 4,604,431 (Fong et al.) issued Aug. 5, 1986, the disclosures of all of which are hereby incorporated hereinto. The sulfonated mer units of such post-polymerization derivatized polymers are generally of the sulfonate N-alkyl substituted (meth)acrylamide type.

U.S. Pat. No. 4,678,840 (Fong et al.) issued Jul. 7, 1987, describes a method for preparation acrylamide polymers having ionizable phosphonate groups, and the disclosures of this patent are incorporated hereinto by reference. Phosphonate-containing acrylamide polymers that meet the present molecular weight requirements may possibly be as active in the present process as the preferred sulfonate-containing acrylamide polymers described above.

High molecular weight acrylamide polymers are commonly synthesized and commercially supplied in the form of water-in-oil latices. Such latex form permits the polymer to be prepared and shipped at reasonably high concentrations, and the polymer therein is readily dispersible in water upon inversion of such emulsion by known techniques. The present invention does not, however, exclude the use of high molecular acrylamide polymers supplied in dry powder form, although such form often requires an extended solubilization period for the preparation of an aqueous solution of the polymer.

The present invention is a bacterial-assisted heap leach process for the solubilization of a metal from a refractory ore containing the metal and containing fines and/or clay. The ore is formed into a heap and at least a portion of the metal in the ore is solubilized by means of bacterial oxidation of sulfides and dissolution into a leaching solution. Such bacterial oxidation and metal dissolution may be sequential or at least partially concomitant chemical changes. The improvement of the invention comprises:

application of an aqueous solution of acrylamide polymer to the ore in an amount effective to agglomerate the fines and/or clay, wherein the acrylamide polymer has a molecular weight of at least 500,000 and is comprised of from about 0 to about 100 mole percent of (meth)acrylamide mer units and from 0 to 100 mole percent of N-sulfoalkyl (meth)acrylamide mer units.

The process of the present invention is also a bacterial-assisted heap process for the solubilization of a metal from a refractory ore containing fines and/or clay wherein an aqueous solution of acrylamide polymer is applied to the ore in an amount effective to agglomerate the fines and/or clay, and the aqueous solution is formed at least in part by recycled bio solution.

The present invention is also a bacterial-assisted heap leach process for the solubilization of a metal from a refractory ore containing the metal and containing fines and/or clay wherein the ore is solubilized by bacterial oxidation of sulfides and the sequential dissolution of the metal into a leaching solution, wherein the leaching solution has a pH of greater than about 9.

In such process (or processes) preferably the acrylamide polymer is applied to the ore as an aqueous solution containing from about 0.004 to about 12.5 weight percent of the acrylamide polymer based on the weight of the aqueous solution. In other preferred embodiments, the acrylamide polymer has a weight average molecular weight of at least 1,000,000, and more preferably a weight average molecular weight of at least about 4,000,000. The acrylamide polymer preferably is comprised of from about 0.1 to about 40 mole percent of N-sulfoalkyl (meth)acrylamide mer units, and more preferably from about 1 to about 25 mole percent of N-sulfoalkyl (meth)acrylamide mer units. In other preferred embodiments, the acrylamide polymer contains cationic mer units, such as DADMAC mer units. The acrylamide polymer is preferably applied to the ore as an aqueous solution and the aqueous solution may have a pH of less than 3 and a concentration of ferric ion of at least 5 grams per liter.

In such a process the acrylamide polymer preferably is applied to the ore in an amount of from about 0.01 to about 5 pounds of acrylamide polymer per ton of ore as mined, or from about 0.01 to about 5.5 pounds of the acrylamide polymer per dry ton of ore.

By "metal" as used herein generally is meant both base and precious metals, and particularly those found in refractory ores in values sufficient to justify a bacterial-assisted heap leaching process to recover same. Such metals are not necessarily limited to the particular metals mentioned above, and may include others such as uranium and the like.

By "leaching solution" is meant herein an aqueous solution containing a chemical species that solubilizes metal when such metal is in a form other than encased in a sulfide matrix or combined together with sulfide. Such term, as used herein, does not include an aqueous solution of microoganisms that only contributes to the process only in the destruction of the sulfides, although some might consider that sulfide destruction alone a leaching process.

By "solubilize" is meant herein that the metal becomes dissolved in an aqueous solution in some form, and is of course not limited to a dissolution of metal as elemental metal, which is a phenomenon not generally encountered.

INDUSTRIAL APPLICABILITY OF THE INVENTION

The present invention is applicable to the mining industry, and particularly to that segment of the mining industry concerned with the recovery of low values of metal from refractory ores.

We claim:

1. A bacterial-assisted heap leach process for the solubilization of a metal from a refractory ore containing said metal and containing fines and/or clay wherein said ore is formed into a heap and at least a portion of said metal in said ore is solubilized by sequential or concomitant bacterial oxidation of sulfides and dissolution of said metal into a leaching solution, said bacterial oxidation of sulfides being effectuated with a bacteria-containing solution having a pH of less than about 3, the improvement in which comprises:

application of an aqueous solution of acrylamide polymer to said ore prior to said ore being formed into said heap, then forming said heap, and then affectuating said solubilization of said metal by sequential or concomitant percolations of said bacteria-containing solution and said leach solution through said heap, said aqueous solution of acrylamide polymer being applied to said ore in an amount effective to agglomerate said fines and/or clay and improve the permeability of said heap during said percolations, wherein said acrylamide polymer has a molecular weight of at least 500,000 and is comprised of from about 0 to about 100 mole percent of acrylamide or methacrylamide mer units and from about 0 to about 100 mole percent of N-sulfoalkyl acrylamide or N-sulfoalkyl methacrylamide mer units.

2. The process of claim 1 wherein said acrylamide polymer is applied to said ore as an aqueous solution containing from about 0.004 to about 12.5 weight percent of said acrylamide polymer based on the weight of said aqueous solution.

3. The process of claim 1 wherein said acrylamide polymer has a weight average molecular weight of at least 1,000,000.

4. The process of claim 1 wherein said acrylamide polymer has a weight average molecular weight of at least about 4,000,000.

5. The process of claim 1 wherein said acrylamide polymer is comprised of from about 0.1 to about 40 mole percent of said N-sulfoalkyl acrylamide or N-sulfoalkyl methacrylamide mer units, and the remainder being substantially said acrylamide or methacrylamide mer units.

6. The process of claim 1 wherein said acrylamide polymer is comprised of up to about 50 mole percent of cationic mer units.

7. The process of claim 6 wherein said caionic mer units are diallyldimethylammonium chloride mer units.

8. The process of claim 1 wherein said acrylamide polymer is applied to said ore as an aqueous solution having a pH of less than 3 and a concentration of ferric ion of at least 1 gram per liter.

9. The process of claim 1 wherein said acrylamide polymer is applied to said ore in an amount of from about 0.01 to about 5 pounds of acrylamide polymer per ton of ore as mined, or from about 0.01 to about 5.5 pounds of the acrylamide polymer per dry ton of ore.

10. A bacterial-assisted heap leach process for the solubilization of a metal from a refractory ore containing said metal and containing fines and/or clay wherein said ore is formed into a heap and at least a portion of said metal in said ore is solubilized by bacterial oxidation of sulfides by percolation of a bacteria-containing solution through said heap, and by the concomitant or sequential dissolution of said metal into a leaching solution by percolation of said leaching solution through said heap, said bacteria-containing solution having a pH of less than about 3, the improvement in which comprises:

application of an aqueous solution of acrylamide polymer to said ore prior to said ore being formed into said heap, then forming said heap, and then effectuating said solubilization of said metal by sequential or concomitant percolations of said bacteria-containing solution and said leaching solution through said heap, said aqueous solution of acrylamide polymer being applied to said ore in an amount effective to agglomerate said fines and/or clay and improve the permeability of said heap during said percolations, wherein said acrylamide polymer has a molecular weight of at least 500,000 and is comprised of from about 0 to about 100 mole percent of acrylamide or methacrylamide mer units and from about 0 to 100 mole percent of N-sulfoalkyl acrylamide or N-sulfoalkyl methacrylamide mer units; and wherein said aqueous solution of acrylamide polymer is formed at least in part by recycled bacteria-containing solution.

11. The process of claim 10 wherein said acrylamide polymer is applied to said ore as an aqueous solution containing from about 0.004 to about 12.5 weight percent of said acrylamide polymer based on the weight of said aqueous solution.

12. The process of claim 10 wherein said acrylamide polymer has a weight average molecular weight of at least 1,000,000.

13. The process of claim 10 wherein said acrylamide polymer has a weight average molecular weight of at least about 4,000,000.

14. The process of claim 10 wherein said acrylamide polymer is comprised of from about 0.10 to about 40 mole percent of said N-sulfoalkyl acrylamide or N-sulfoalkyl methacrylamide mer units and the remainder of said mer units are substantially acrylamide or methacrylamide mer units.

15. The process of claim 14 wherein said acrylamide polymer is comprised of from about 1 to about 25 mole percent of said N-sulfoalkyl acrylamide or N-sulfoalkyl methacrylamide mer units.

16. The process of claim 10 wherein said acrylamide polymer is applied to said ore in an amount of from about 0.01 to about 5 pounds of acrylamide polymer per ton of ore as mined, or from about 0.01 to about 5.5 pounds of the acrylamide polymer per dry ton of ore.

17. A bacterial-assisted heap leach process for the solubilization of a metal from a refractory ore containing said metal and containing fines and/or clay, said metal being entrapped in a sulfide matrix in said ore, wherein said ore is formed into a heap and at least a portion of said metal in said ore is at least partially freed from said matrix by bacterial oxidation of sulfides by percolation of a bacteria-containing solution through said heap, and said metal is at least partially solubilized by dissolution into a leaching solution by percolation of said leaching solution through said heap, wherein said bacteria-containing solution has a pH of less than about 3 and said leaching solution has a pH of greater than about 9, comprising:

application of an aqueous solution of acrylamide polymer to said ore prior to said ore being formed into said heap, then forming said heap, and then effectuating said oxidation of sulfides and solubilization of said metal by sequential percolations of said bacteria-containing solution and said leaching solution through said heap, said percolation of said bacteria-containing solution being completed prior to the commencement of said percolation of said leaching solution, said aqueous solution of acrylamide polymer being applied to said ore in an amount effective to agglomerate said fines and/or clay and improve the permeability of said heap during said percolations, wherein said acrylamide polymer has a molecular weight of at least 500,000 and is comprised of from about 0 to about 100 mole percent of acrylamide or methacrylamide mer units and from about 0 to 100 mole percent of N-sulfoalkyl acrylamide or N-sulfoalkyl methacrylamide mer units.

18. The process of claim 17 wherein said aqueous solution is formed at least in part by recycled bacteria-containing solution having a pH of less than about 3 and having an iron content, in the form of ferric ions, of at least 1 gram per liter of recycled bacteria-containing solution.

19. The process of claim 17 wherein said acrylamide polymer is comprised of from about 0.10 to about 40 mole percent of said N-sulfoalkyl acrylamide or N-sulfoalkyl methacrylamide mer units and the remainder of said mer units are substantially acrylamide or methacrylamide mer units.

20. The process of claim 17 wherein said acrylamide polymer is applied to said ore in an amount of from about 0.01 to about 5 pounds of acrylamide polymer per ton of ore as mined, or from about 0.01 to about 5.5 pounds of the acrylamide polymer per dry ton of ore.

21. The process of claim 10 wherein said metal is entrapped in said ore in a sulfide form, wherein said bacteria-containing solution is also said leaching solution, and wherein said aqueous solution of acrylamide polymer has a pH of less than about 3 and has a iron content of at least 1 gram of ferric ion per liter of said aqueous solution.

22. The process of claim 21 wherein said aqueous solution of acrylamide polymer has an iron content of at least 5 grams of ferric ion per liter of said aqueous solution.

23. The process of claim 10 wherein said leaching solution is a cyanide solution having a pH of at least 9.5 and said leaching solution is percolated through said heap after the completion of said percolation of said bacteria-containing solution.

24. The process of claim 23 wherein said aqueous solution of acrylamide polymer has a pH of less than about 3 and an iron content of at least 1 gram of ferric ion per liter of said aqueous solution.

* * * * *

UNITED STATES PATENT AND TRADEMARK OFFICE
CERTIFICATE OF CORRECTION

PATENT NO. : 5,196,052

DATED : March 23, 1993

INVENTOR(S) : Anthony E. Gross and Jay S. Gomer

It is certified that error appears in the above-identified patent and that said Letters Patent is hereby corrected as shown below:

In column 2, line 35, after "will" delete "a" and substitute therefor -- at --.

In column 11, line 15, after "heap" insert -- leach --.

In column 11, line 34, after "more" delete "w".

Signed and Sealed this

Twenty-third Day of November, 1993

Attest:

BRUCE LEHMAN

*Attesting Officer*  *Commissioner of Patents and Trademarks*